Patented June 30, 1936

2,045,929

UNITED STATES PATENT OFFICE 2,045,929

PROCESS FOR THE SEPARATION OF METHYL AMINES

Lloyd C. Swallen, Terre Haute, Ind., assignor to Commercial Solvents Corporation, Terre Haute, Ind., a corporation of Maryland No Drawing. Application August 29, 1932, Serial No. 630,796

6 Claims. (Cl. 202—39)

This invention relates to a method for the separation of methyl amines. More specifically, this invention relates to a process for the separation of tri-methyl amine from mixtures containing di- and tri-methyl amines.

Methyl amines may be prepared from formaldehyde and ammonium chloride, from methyl cyanate, by the reduction of hydrocyanic acid, or by the action of ammonia on methyl iodide, methyl chloride, methyl nitrate, etc. However, they may best be made on a commercial scale by catalytic synthesis from methanol and ammonia as disclosed in co-pending applications, Serial Nos. 468,992 and 468,993 filed June 18, 1930, by Jerome Martin and Lloyd C. Swallen. Regardless of the method of preparation, a mixture of amines is obtained from which the ammonia is first removed and from which the mono-methyl amine may then be removed by any known method, for example, that of co-pending application, Serial No. 630,797, filed August 29, 1932, by Lloyd C. Swallen. The recovery of tri-methyl amine from the resulting mixtures of di- and tri-methyl amines has presented a problem which has not been satisfactorily solved until the present time. Expensive and complicated methods involving the formation of salts and fractional crystallization or selective solution have been employed. These methods, however, are obviously disadvantageous from the standpoint of commercial production.

The surprising discovery has now been made that di- and tri-methyl amines possess properties which make possible a separation by selective absorption in water of the somewhat more soluble di-methyl amine and subsequent displacing from the solution any dissolved tri-methyl amine by scrubbing with gaseous di-methyl amine. This method obviates the disadvantages of the previous procedures and constitutes a satisfactory and economical method of separating such mixtures.

The method of the present invention comprises essentially absorbing the di-methyl amine in water under atmospheric or superatmospheric pressures and displacing from the resulting solution any tri-methyl amine by scrubbing with a current of gaseous di-methyl amine. The various methods for carrying out this invention may best be illustrated by the following specific examples:

Example I

A concentrated aqueous solution containing di- and tri-methyl amines is charged into the kettle of a still equipped with a bubble cap plate column. Water is introduced at the top of the column and heat is supplied to the kettle at such relative rates that gaseous tri-methyl amine is taken off at the top of the column and di-methyl amine passes up the column to displace tri-methyl amine from the descending aqueous solution and is itself totally absorbed by the water before reaching the top of the column. The rate of distillation is carefully adjusted so that no di-methyl amine reaches the top of the column and the distillation is discontinued when an analysis of the material in the kettle shows the desired purity of di-methyl amine, or if pure tri-methyl amine is the desired product, when it can no longer be removed from the top of the column without removing with it a substantial concentration of di-methyl amine.

Example II

The gaseous mixture containing di- and tri-methyl amine is introduced into an intermediate plate of a bubble cap plate column equipped with a steam heated kettle, and water is allowed to flow down the column from the top and to collect in the kettle. The di-methyl amine is selectively absorbed by the water, and the tri-methyl amine which is also absorbed to some extent, is scrubbed out by a current of gaseous di-methyl amine obtained by heating the kettle containing the aqueous solution of di-methyl amine. In this manner water enters the top of the column and the gaseous mixture at the center of the column; di-methyl amine vapor from the heated solution in the kettle passes up the column countercurrently to the down flowing liquid and displaces the tri-methyl amine from the solution; the tri-methyl amine, a certain amount of water vapor, traces of di-methyl amine, and any non-condensable gases which were present in the original mixture are taken off at the top of the column. Thus, an aqueous solution of di-methyl amine is obtained in the kettle and gaseous tri-methyl amine is obtained at the top of the column.

In operating according to this method it is apparent that the capacity of the column will govern the rate of flow of the incoming gaseous mixture; that is, the mixture will be introduced at a rate somewhat below the maximum which is the rate at which the tri-methyl amine content represents to all practical purposes, the capacity value of the column, i. e., the vapor velocity at which there is no choking or entrainment. The water will be introduced at the top of the column at such a rate as to give a substantially constant composition on each plate and to yield a concentrated solution of di-methyl amine in the kettle. The rate of distillation of di-methyl amine from the aqueous solution in the kettle should be such as to just saturate the water descending in the column at the temperature existing in the column. The operating conditions will be somewhat different for any particular column employed but it is evident that one skilled in the art may easily adjust the conditions so as to give optimum results.

*Example III*

A mixture of liquid di- and tri-methyl amines is charged into a steam heated kettle equipped with a bubble cap plate column and condenser so arranged that the condensate can be divided as desired into product and reflux to the head of the column. Water is introduced at the top of the column and heat is supplied to the kettle at such a rate that there will be a total reflux of di-methyl amine. The tri-methyl amine is taken off at a rate such that a reflux ratio of about 5 to 1 is maintained. The water is introduced at a rate approximately equal to the rate at which the liquid tri-methyl amine is taken off, and approximately this same rate is maintained throughout the distillation even though the rate at which the amine is taken off must be reduced toward the end of the distillation. The distillation is carried out under a pressure of about 25 lbs. per square inch and at this pressure the temperature at the top of the column will be found to be about 38 to 40° C. when only pure tri-methyl amine reaches this point of the column. If the temperature is found to rise the flow of product is cut down, thus increasing the reflux ratio, or the amount of water introduced at the top of the column is increased. When the temperature at the bottom of the column is found to reach a value of about 25–30° C., (depending upon the total amount of water introduced), above the boiling point of the tri-methyl amine at the operating pressure or when an analysis of the material in the kettle shows the desired purity of di-methyl amine, the distillation is stopped and the solution of di-methyl amine is withdrawn from the kettle.

*Example IV*

The mixture containing di- and tri-methyl amines is compressed to a pressure of about 25 lbs. per square inch and is cooled to liquefy the amines. The mixture is then introduced into an intermediate plate in a bubble cap plate column equipped with a steam heated pressure kettle and a condenser so arranged that the condensate can be divided as desired into product and reflux to the head of the column. Water is introduced at the top of the column and is allowed to flow down and collect in the kettle. The partial vapor pressure of the di-methyl amine is lowered by the presence of water more than is that of the tri-methyl amine. Consequently the di-methyl amine is washed down the column and collects in the kettle as an aqueous solution. This solution is boiled in the kettle under a pressure of approximately 25 lbs. per square inch in order that a current of gaseous di-methyl amine will pass up the column counter-currently to the down-flowing liquid and displace any tri-methyl amine present in the liquid on the plates. The water is introduced at a rate approximately equal to the rate at which the liquid tri-methyl amine is taken off, and approximately this same rate is maintained throughout the distillation even though the rate at which the amine is taken off must be reduced toward the end of the distillation. The rate at which the tri-methyl amine is removed from the column and the rate of heating the solution of di-methyl amine in the kettle are adjusted so as to obtain a reflux ratio of approximately 5 to 1. The temperature at the top of the column will be found to be from 38 to 40° C. when operating at 25 lbs. pressure. When the product at the top of the column is not pure tri-methyl amine the temperature will be found to rise and the rate of flow of the product is then reduced, thus increasing the reflux ratio. When the kettle has become filled with di-methyl amine solution, the feed is shut off and the distillation is completed as in Example III.

In operating according to this procedure it is apparent that the capacity of the column will govern the rate of flow of the incoming mixture and the rate of distillation of the solution in the kettle. The mixture will be introduced at a rate somewhat below the maximum which is the rate at which the tri-methyl amine content of the incoming mixture together with a reflux of five times that quantity represent the capacity value of the column, i. e., the vapor velocity at which there is no choking or entrainment. The rate of distillation of the di-methyl amine from the aqueous solution in the kettle will be such that a reflux ratio of about 5 to 1 is attained, and such that there is a total reflux of di-methyl amine. It is seen that operating conditions will be somewhat different for any particular column employed but that one skilled in the art may easily adjust the conditions to give optimum results.

In operating according to any of the above procedures tri-methyl amine of 95% purity may readily be obtained and the tri-methyl amine content of the aqueous solution of di-methyl amine in the kettle may easily be reduced to below 2 mol. per cent. In some cases, however, especially if an inefficient column is employed, it may be desirable to take off an intermediate fraction, which is subsequently re-distilled, in order to obtain sufficiently pure tri-methyl amine. If extremely pure tri-methyl amine is desired a single crystallization of the hydrochloride will yield an exceedingly pure product.

It is to be understood that the above examples are cited merely as illustrative of the method of carrying out the invention, and that the procedure may be modified in many respects without departing from the spirit of the invention. For example, various types of apparatus other than those specified might be employed. In view of the delicate balance of rate of feed, rate of introduction of water and rate of distillation of the gaseous di-methyl amine for scrubbing out the tri-methyl amine that is required to maintain a substantially constant composition on the plates, it may be found advantageous to use a column which is so constructed as to hold a large amount of liquid on each plate. In this way the concentration on each plate would change only slowly, even though optimum operating conditions were not employed. The same effect could be obtained by the use of a series of tanks through which the gases would bubble in series, tri-methyl amine coming off at one end, the feed going in at the middle and the di-methyl amine coming off at the other end. The solutions could be moved up from tank to tank either continuously or in batches. In the latter case the change being made when the final tank contained di-methyl amine of the desired purity.

Operating conditions differing somewhat from those specified in the examples may also be used. In the example in which the distillation was carried out under pressure, only a pressure of 25 pounds was specified. However, pressures from 15 to 30 pounds have been found to be quite satisfactory. At higher pressures the separation appears to be slightly less sharp, but it is seen that higher pressures could be used if a more efficient column was employed. Lower pressures could be used if means were provided for cooling the condenser or as seen in the other examples even atmospheric pressure may be used if it is not desired to obtain the tri-methyl amine in the liquid state. Although a reflux ratio of 5 to 1 and a ratio of water to product of 1 to 1 were specified, these values may be changed within considerable limits depending upon the particular column employed and one skilled in the art could easily make these adjustments to obtain optimum operating conditions.

It is apparent that the process of the present invention may be applied to mixtures consisting of only di-methyl amine and tri-methyl amine for the separation thereof; it may be applied to various mixtures containing di- and tri-methyl amines for obtaining substantially pure tri-methyl amine; or it may be applied to mixtures containing as their only volatile constituents di- and tri-methyl amines for obtaining substantially pure di-methyl amine. By the term "volatile constituents" in the sense used here and in the appended claims is meant constituents more volatile than water. In the latter case, the purified di-methyl amine may be obtained from the aqueous solution by known methods of crystallization of its salts; or, if non-volatile impurities are present, by a simple distillation, followed by crystallization if greater purity is desired.

The invention now having been described, what is claimed is:

1. In a process for the separation of a mixture containing di- and tri-methyl amines the steps which comprise absorbing the di-methyl amine and at least a part of the tri-methyl amine in water and displacing the tri-methyl amine from the resulting aqueous solution by contacting said solution with gaseous di-methyl amine.

2. In a process for the separation of a mixture containing di- and tri-methyl amines the steps which comprise absorbing the di-methyl amine and at least a part of the tri-methyl amine in water and displacing the tri-methyl amine from the resulting aqueous solution by contacting said solution wih gaseous di-methyl amine, said operations being carried out at pressures from atmospheric to 30 lbs. per square inch.

3. In a process for the separation of a mixture containing di- and tri-methyl amines the steps which comprise absorbing the di-methyl amine and at least a part of the tri-methyl amine in water and displacing the tri-methyl amine from the resulting aqueous solution by contacting said solution with gaseous di-methyl amine, said operations being carried out at a pressure of approximately 25 lbs. per square inch.

4. In a process for the separation of a mixture containing di- and tri-methyl amines the steps which comprise effecting a fractional distillation of said mixture while passing water down the fractionating column to absorb the di-methyl amine.

5. In a process for the separation of a mixture containing di- and tri-methyl amines the steps which comprise effecting a fractional distillation of said mixture while passing water down the fractionating column to absorb the di-methyl amine, said distillation being carried out at pressures from atmospheric to 30 lbs. per square inch.

6. In a process for the separation of a mixture containing di- and tri-methyl amines the steps which comprise effecting a fractional distillation of said mixture while passing water down the fractionating column to absorb the di-methyl amine, said distillation being carried out at a pressure of approximately 25 lbs. per square inch.

LLOYD C. SWALLEN.